(12) United States Patent
Chilcote et al.

(10) Patent No.: US 7,163,630 B2
(45) Date of Patent: *Jan. 16, 2007

(54) METHOD AND APPARATUS FOR ENHANCING FILTER BED PERFORMANCE

(76) Inventors: Dennis Chilcote, 2853 41st Ave. S., Minneapolis, MN (US) 55406; Michael S. Gratz, 10305 W. 70th St., Eden Prairie, MN (US) 55344; Robert Clifford, 10305 W. 70th St., Eden Prairie, MN (US) 55344; John Mills, 10305 W. 70th St., Eden Prairie, MN (US) 55344; Gregory Vineretsky, 10305 W. 70th St., Eden Prairie, MN (US) 55344; Daniel Mc Graw, 10305 W. 70th St., Eden Prairie, MN (US) 55344; Alan Dunn, 10305 W. 70th St., Eden Prairie, MN (US) 55344; Bobby Dabbs, 10305 W. 70th St., Eden Prairie, MN (US) 55344; Karie Mars, 10305 W. 70th St., Eden Prairie, MN (US) 55344

( * ) Notice: Subject to any disclaimer, the term of this patent is extended or adjusted under 35 U.S.C. 154(b) by 0 days.
This patent is subject to a terminal disclaimer.

(21) Appl. No.: 11/126,433

(22) Filed: May 10, 2005

(65) Prior Publication Data
US 2005/0211628 A1 Sep. 29, 2005

Related U.S. Application Data

(63) Continuation of application No. 10/632,527, filed on Aug. 1, 2003, now Pat. No. 6,890,440.
(60) Provisional application No. 60/401,267, filed on Aug. 4, 2002.

(51) Int. Cl.
*C02F 3/04* (2006.01)
(52) U.S. Cl. .................. 210/618; 210/150; 210/272
(58) Field of Classification Search ............... 210/617, 210/618, 792, 796, 150, 151, 272
See application file for complete search history.

(56) References Cited

U.S. PATENT DOCUMENTS 1,796,960 A    3/1931    Ricks et al.
2,880,874 A    4/1959    Ferrara ..................... 210/272

(Continued)

FOREIGN PATENT DOCUMENTS

GB                287692        11/1927
WO        WO 98/09919         3/1998
WO        WO 00/21635         4/2000

*Primary Examiner*—Christopher Upton
(74) *Attorney, Agent, or Firm*—Mark A. Litman & Associates, P.A.

(57) ABSTRACT

In a vessel containing a filter bed and containing a mixed liquor containing suspended solids, a system disturbs/dislodges a sludge mat that settles on the filter bed. Thus, the system controls the sludge mat on the filter bed that otherwise may blind the filter bed and significantly reduce or stop process liquid flow into and through the filter bed. The system helps maintain effective vessel effluent flowrates with reduced requirements for filter bed backwashing or other filter bed maintenance. The system includes a sludge mat dislodging member that moves along the filter bed surface, preferably on but substantially not inside the filter bed, to disrupt/dislodge the sludge mat and/or prevent formation of the sludge mat. Preferably, the dislodging member is carried inside the vessel on a moving arm or arms that rotate in a plane parallel to the filter bed surface. The preferred sludge mat dislodging member(s) hang from the rotating arm(s) to slide along the top of the filter bed through the sludge mat. The sludge mat control methods and apparatus preferably are used during normal operation of the reactor/vessel, without requiring shutdown or interruption of the process. The methods and apparatus may be effective in sludge blanket microbial remediation reactors that require high flowrates of liquid effluent due to low residence times in a given vessel.

28 Claims, 9 Drawing Sheets

U.S. PATENT DOCUMENTS

| | | | |
|---|---|---|---|
| 3,078,188 A | 2/1963 | Assalini | 127/55 |
| 3,292,788 A | 12/1966 | Schwartz | 210/272 |
| 3,940,333 A | 2/1976 | Schreiber et al. | 210/150 |
| 4,182,675 A | 1/1980 | Jeris | 210/618 |
| 5,277,814 A | 1/1994 | Winter et al. | 210/618 |
| 5,616,304 A | 4/1997 | Stormo | 422/227 |
| 5,744,105 A | 4/1998 | Stormo | 422/227 |
| 5,779,996 A | 7/1998 | Stormo | 422/227 |
| 6,346,412 B1 | 2/2002 | Stormo | 435/262 |
| 6,890,440 B1 | 5/2005 | Chilcote et al. | 210/618 |

METHOD AND APPARATUS FOR ENHANCING FILTER BED PERFORMANCE

This application claims priority, and is a continuation, of patent application Ser. No. 10/632,527, filed Aug. 1, 2003, entitled "Method and Apparatus for Enhancing Filter Bed Performance," issued May 10, 2005 as U.S. Pat. No. 6,890,440, which claims priority of provisional application Ser. No. 60/401,267, entitled "Method and apparatus for Improving the Withdrawal of Liquid from a Settled Bed of Solid Particles in a Microbial Reactor," filed Aug. 4, 2002, which is incorporated herein by this reference.

BACKGROUND OF THE INVENTION

1. Field of the Invention

This invention relates, generally, to apparatus and methods of operation for a filter bed installed in a microbial remediation reactor or in other chemical, petrochemical, waste, or food process vessels. More specifically, the invention relates to improvement of filter bed performance by moving and/or preventing formation of the sludge mat that tends to settle on top of the filter bed surface, so that the sludge mat does not block flow through the filter bed to an extent that requires premature backwashing of the filter bed.

2. Background Art

The instant invention is particularly effective in, but is not limited to, downflow sludge blanket reactors used for microbial remediation of various wastewater streams. For example, the instant invention may be effective for treating streams comprising activated sludge; fats, oils, and grease ("FOG"); suspended BOD solids; and soluble BOD; such as flow from municipal waste plants or food and meat processing plants. The invention is particularly effective in optimizing anaerobic microbial treatment of high FOG and high total suspended solids ("TSS") streams, or treatment of lower FOG/TSS streams or soluble BOD streams wherein low residence times and the associated high effluent flowrates require efficient filter bed performance and control of filter bed plugging. Examples of some of the many embodiments of microbial reactors that may benefit from the instant invention are described in patents to Stormo (U.S. Pat. No. 5,616,304, "Slurry Reactor"; U.S. Pat. No. 5,744,105, "Slurry Reactor"; and U.S. Pat. No. 5,779,996, "Microbial Remediation Reactor and Process"; and U.S. Pat. No. 6,346,412, "Microbial Remediation Reactor and Process").

The preferred microbial reactor may utilize a diverse population of suspended microorganisms (herein "biomass") to treat the waste and contaminants contained in the mixed liquor in the reactor (the bulk liquid in the reactor containing suspended and dissolved solids). In the bottom of the preferred downflow reactors is a settled bed of coarse solids, such as course sand. The sand bed filters reactor liquid as it passes through the filter bed, and out of the reactor as reactor effluent. The sand bed filters out the solids (including biomass and other solids) from the reactor liquid, in order to retain the biomass in the reactor and to retain the waste solids in the reactor for the desired remediation residence time. Without preventive or remediative measures, the sand bed typically becomes plugged with solids, and, in doing so, slows and eventually stops the flow of reactor effluent. When flow through the filter bed slows, the conventional solution is to "backwash" the filter bed, by the conventional technique of liquid flow up through the filter bed, or by the technique of stirring and fluidizing the filter bed as discussed below.

U.S. Pat. No. 6,346,412 ("the '412 patent") teaches the use of a mixing blade P-78 inside the sand bed P-84 as a means to prevent or alleviate plugging of the sand bed. See FIG. 1. Patent '412 teaches that the sand bed "may be used as a filter as the water is removed from the bottom of the reactor. Any suspended material, including biomass, is retained by the sand filter therefore allowing very high biomass densities to be maintained, with resulting very high activity. As the mixing blade moves through the sand bed, it fluidizes the sand near the blade and keeps the biomass from plugging the sand or the screened outlet." See screen P-86 and outlet P-82 in FIG. 1. Thus, the mixing blade in the sand bed as described in U.S. Pat. No. 6,346,412 performs a "backwash" step, of unplugging or preventing plugging of the sand bed, by rotating through the sand bed to fluidize the sand bed. While this stirring technique does not involve back-washing with up-flow liquid and does not involve emptying the reactor, it does require shutting off the flow out of the reactor, and, hence, is disruptive to the reactor operation and productivity.

The '412 patent further discloses the use of a sand bed mixing blade in an aerobic reactor, wherein the mixing blade is in the upper region of the sand bed, while leaving the lower region of the sand bed relatively undisturbed. This technique is a means for back-washing the sand bed while leaving the lower region of the sand bed as an anaerobic denitrification region. Still, this technique involves stirring of the sand bed to solve the low/no reactor effluent problem in the reactor.

To rotate a sand bed stirring mechanism, such as embodiments described in the '412 patent, the horizontal stirrer blade P-78 is supplied with fluid from a central, vertical supply conduit P-76. Fluid preferably passes through openings at or near the blade's leading side for fluidization, and through openings at or near the blade's trailing side for propulsion. The fluidization back-washes the sand, removing solids from the voids in the bed and forcing the solids back up into the reactor. After this back-washing process is performed, movement of the stirring mechanism is preferably stopped and flow of reactor effluent resumes.

In some microbial remediation reactor operations, the effluent flow-rate can easily be maintained with intermittent fluidization by means of the above-described in-sand stirrer blade "back-washing" the sand bed. However, the inventors have discovered that in many operations and under many conditions, the frequency of sand bed backwashing must increase to an extent that makes it difficult to maintain productive operation of the reactor, and difficult or impossible to retain sufficient biomass in the reactor for the desired microbial activity and to retain the waste solids in the reactor for the residence time required for remediation.

Therefore, there is still a need for improved apparatus and methods for operating a reactor having a filter bed in such a way that frequent backwashing of the filter bed is not required to maintain an acceptable rate and quality of reactor effluent discharge. There is need for apparatus and methods that improve filter bed operation, especially in moderate BOD applications such as waste-waters having 1000 mg/L BOD and 100 TSS up to 50,000 mg/L BOD and 10,000 TSS. Such applications are characterized by short residence times on the order of hours, rather than days, and consequently the reactors are designed for high effluent flowrates. The filter beds of such applications need to be effective and long-lived in order to achieve these flowrates. The present invention meets these and other needs, as will be clear from the following description, drawings, and claims.

SUMMARY OF THE INVENTION

The present invention comprises methods and apparatus for improving operation of a filter bed in a microbial remediation reactor, a filtration vessel, or other process vessel. The invented method and apparatus provide for reducing, dislodging, or otherwise controlling the process solids that settle on the filter bed, especially in down-flow operations as liquid is flowing through the filter bed to be withdrawn from below/in the filter bed. The invented method and apparatus comprise dislodging the process solids that settle on top of the filter bed, to prevent the solids from "blinding" the filter bed to an extent that slows flow into the filter bed an unacceptable amount or that stops flow into the bed. In some embodiments, the settled solids may serve as the top layer of a dual-media filtration system comprising the solids and the filter bed, so that controlling the settled solids by a renewal step, rather than completely eliminating the settled solids, may optimize filtration and biomass retention.

In the preferred embodiments, a dislodging member is moved along the top of the filter bed to dislodge at least a portion of the settled process solids and uncover at least a portion of the filter bed top surface. This uncovering step allows the process liquid to access the filter bed, so that the liquid may flow through the filter bed as intended. By utilizing the invented method and/or apparatus, flow is maintained through the filter bed until the filter bed itself is restricted or plugged by solids in the voids in the filter bed. This way, the filter bed capacity is the limiting factor in requiring back-washing of the filter bed or a shutdown for clean-out, rather than the typically quick-settling solids that form the "blinding" mat on top of the filter bed.

The invented methods and apparatus may be used in many process and unit operation vessels. There may be a process taking place in the vessel above the filter bed, such as a chemical reaction or microbial process, or, alternatively, filtration through the subject filter bed may be the only operation taking place in the vessel. In either case, the liquid above the filter bed may be called herein "process liquid," and this means the bulk of the liquid above the filter bed in the vessel whether it is involved in a chemical or microbial process or simply feedstock that flows into the vessel for the unit operation of filtration.

In a preferred embodiment of the invention, the method of dislodging settled solids is applied in a down-flow microbial remediation reactor, wherein the reactor contains mixed liquor that comprises various waste materials, contaminants, and microbes in water. The solids tend to settle on the filter bed by gravity and by down-flow reactor flowscheme. In such embodiments, the solids tend to form a sludge mat that is dry relative to the process liquid ("mixed liquor") above it, and this sludge mat greatly restricts or completely stops liquid flow into the filter bed, and, hence, greatly restricts or stops reactor effluent. The inventors have found that even a mat thickness of less than two inches can severely slow or stop reactor effluent flow.

The preferred apparatus comprises one or more arms carrying dislodging members across the top surface of the bed, preferably on but not in the filter bed, to contact and move aside the sludge mat in their paths. This moving of the mat "un-blinds" that portion of the filter bed for further filtration, allowing continued process liquid flow down into the filter bed for further filtration and discharge as reactor effluent. Typically, the remediation reactor may operate for an extended time with intermittent or continuous dislodging of the sludge mat and without any stirring or other back-washing of the filter bed itself. Overall productivity and ease of operation are enhanced with the invented methods and apparatus, especially in microbial remediation operations wherein the feed water quality dictates lower residence times and high reactor effluent flowrates.

DETAILED DESCRIPTION OF THE PREFERRED EMBODIMENTS

Figure 1:
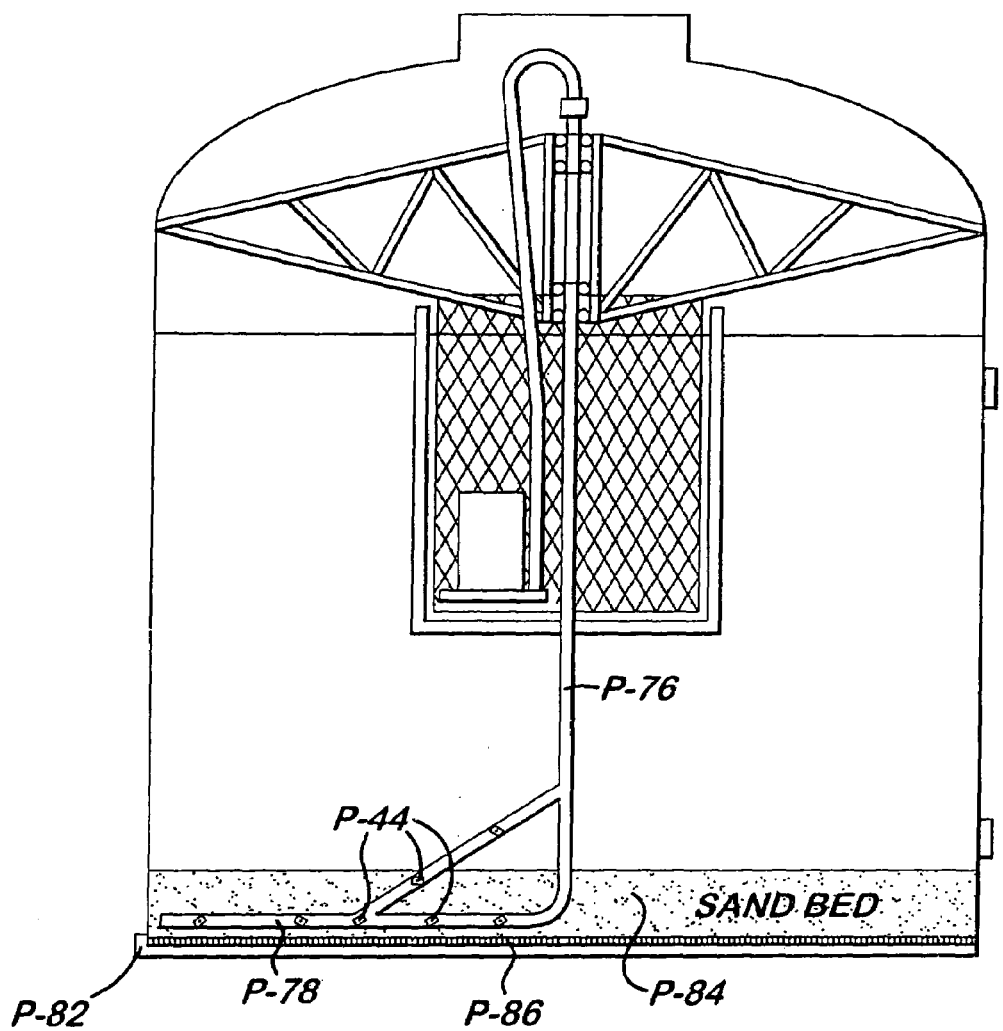
FIG. 1 is a side view of a prior microbial reactor with a sand bed and a sand bed stirring blade, according to one embodiment of U.S. Pat. No. 6,346,412.

The Figures and the following description illustrate embodiments of the invented methods and apparatus for enhancing filter performance, by control or renewal of the top layer in a multilayer filtration system. The preferred process and filter bed are in a down-flow sludge blanket reactor ("SBR") that remediates wastewater, the name being due to the reactor being full of a "blanket" of "sludge" comprising microbes, waste products such as food waste or sewage upon which the microbes feed, and water. While the invention may be applied to both aerobic and anaerobic reactors and to many different qualities of waste water, the invention proves especially beneficial to anaerobic reactors with medium to high total suspended solids (TSS) and high fats, oils, and grease (FOG), and/or high soluble BOD.

A filter bed may be installed in a down-flow microbial remediation reactor, to filter solids from the process liquid flowing out as reactor effluent. This way, the mixed liquor, including the biomass, remains in the reactor for continued residence time rather than flowing out of the vessel. Thus, the remediation of the waste and contaminants in the mixed liquor continues, and only relatively clean, low BOD (biological oxygen demand) liquid flows out of the reactor. Proper filtration and control of reactor effluent are factors in maintaining the proper concentration of microbes and nutrients in the mixed liquor, which is crucial for effective remediation.

The inventors believe that the filtration media in many embodiments of down-flow sludge blanket reactors may be described as a "dual" media. First, and lower in the reactor, is the filter bed comprising coarse particulate that may be sand, carbon or coal granules, glass beads, or other non-soluble filter media.

In many remediation reactors, the chosen filter bed is very coarse sand or sized like small pebbles, and so may be referred to hereafter as the "sand bed" or "sand filter." It may be understood that the filter bed particulate is of a coarseness/size and shape that provide many voids between the particles for receiving and physically trapping solids from the reactor.

Second, and forming on the top surface of the filter bed, is a layer of settled solids from the process liquid. Both the sludge mat and the filter bed may be beneficial for the operation, because, combined, they can provide excellent filtration for the reactor effluent. However, the dual media may be operable only to a point at which the thickness, density, impenetrability, or other characteristics of one or the other filter media severely limits liquid flow through the settled solids/filter bed combination. At this point, the required effluent flowrate may not be maintained, and proper reactor operation may be jeopardized.

Although the settled solids is believed to be an effective and beneficial filtration layer in many instances, the settled solids may also be the limiting factor in operability of the filtration system. The settled solids that may serve as a top layer of filtration media also may be a sludge mat of such thickness, density, and relative dryness that it can greatly reduce or even completely block fluid flow into the filter bed and, hence, out of the reactor. While the mixed liquor is typically less than 2 wt-% solids in water, the sludge mat is typically 2–20 wt-% solids (approximately 20,000–200,000 mg/L solids). Depending on the reactor operating parameters, feed quality, and target effluent quality of flowrate, the formation of a mat that slows the flow into the filter bed (and hence the rate of reactor discharge) to an unacceptably low value may occur before the sand filter is plugged ("loaded" with solids). In these instances, therefore, the upper layer of filtration media, the sludge mat, becomes the limiting factor before the sand bed.

Therefore, embodiments of the invention comprise methods and apparatus to control the formation of a dual-layered filtration media by reducing or dislodging the sludge mat that forms on the sand bed. Due to the sludge mat being a main factor in slowing effluent rates, the control of the sludge mat is particularly important for extending the process run length before back-washing or shutdown. With proper control or "renewal" of the sludge mat, which may be considered renewal of the filter bed surface, the run length typically may continue until the filter bed plugs with solids.

The preferred method and apparatus for controlling the sludge mat comprise one or more dislodging members in the top filtration layer, that is, on or very near the top surface of the sand bed, but outside the sand bed. The dislodging member comprises a "top-surface" blade, scraper, or other member that disrupts and moves the sludge mat, but does not plow or dig significantly into the sand bed. Preferably, the dislodging member does not disrupt or move any of the sand, or, at the most, disrupts the sand very minimally. The dislodging member may move in any direction across the top surface of the filter, powered by one or more methods, including mechanized (motor) drive, hydraulic propulsion, magnets, or other power means, for example. The preferred direction and means are rotation on an axis in a plane parallel and closely above the sand surface. Other directions and means of movement may be used. An arm or arms may be connected to the vessel wall rather than being installed centrally, for example, so that the arm may roll on a wheel or travel on a track on a surface of the vessel. An arm or arms may extend through the vessel wall and be powered and controlled on the outside of the vessel, but a seal would be required to close the vessel in spite of the arm(s) movement and this would be difficult.

Propulsion methods for the sludge mat dislodging system may include a propulsion stream directed from the dislodging system in the trailing direction, with or without a fluidization stream directed from the dislodging system in the leading direction. It is preferred to have all fluid streams associated with moving the dislodging system to be distanced from the sand surface, and, therefore, distanced from the dislodging member on the sand surface. This may be accomplished by providing a rotating propulsion arm with fluid nozzles/openings well above the sand bed and mechanically and operatively connecting it to the rotating arm holding the dislodging member. This placement of the propulsion arm in the middle of the mixed liquor typically allows propulsion jets to power the dislodging system without the need for fluidizing jets on the leading-edge of any portion of the arms. The middle level of the mixed liquor is typically the least dense region of the reactor contents, so that locating the propulsion stream in this middle region is particularly effective for providing propulsion, without the need for fluidization and with little or no shredding/pulverizing of the solids in the mixed liquor.

Distancing of the fluid jets from the sludge mat prevents the fluid jets from shredding/disintegrating the sludge mat into very small particles, or even single cells. This, in turn, helps keep the biomass and solids inside the reactor rather than allowing them to flow out in the reactor effluent, resulting in high microbial activity and long residence time for the solids under remediation. When control of the sludge mat is not sufficient to maintain the desired effluent flowrate, back-washing of the filter bed may be done by stirring and/or fluidizing the sand bed. One or more sand bed stirring mechanisms may be provided, for example, according to stirring techniques disclosed in U.S. Pat. No. 6,346,412 ("the '412 patent"). This way, the reactor employs both a dislodging member at or slightly above the sand surface and a stirring mechanism inside the sand bed. The sand bed stirring arm may be powered in various directions by various means, such as a motor drive or hydraulic propulsion. The sand stirrer blade is preferably powered by fluid flow, with a combination of trailing-side propulsion nozzles/openings and leading-side fluidization nozzles/openings. The fluidization nozzles fluidize the sand in front of the sand stirring blade, which unplugs and cleans the sand and also makes blade rotation easier and less likely to shred the biomass and solids. The fluidization nozzles may be supplied with mixed liquor, filtered reactor effluent, or fresh water, for example.

Preferably, both the dislodging system and the sand bed stirrer blade rotate in the vessel on hydraulically-propelled arms, with movement and control of the two systems being independent of each other. Probably, the dislodging system propulsion and the sand bed stirring propulsion are both supplied by pumping of mixed liquor taken from near the middle of the reactor, but may also be reactor feed, reactor effluent, or fresh water, for example.

The preferred sludge mat dislodging system comprises one or more dislodging members, sweeping along the top surface of the sand bed, temporarily disrupting, dispersing or otherwise moving the mat of sludge. A plurality of dislodging members may be provided on a single rotating arm, on front and rear portions of the single rotating arm, or on multiple rotating arms, so that the members reach all areas of the sand surface at some time during the arm(s) rotation. Dislodging members on multiple arms or arm portions may be radially offset, so that members rotate all or substantially all across the radius of the sand bed to clear all or substantially all of the sludge mat in a complete revolution of the arms. Less preferably, the dislodging members may rotate across only a portion of the sand bed that is deemed to be sufficient for filtration operation.

The dislodging member may be described as being at least substantially outside of the bed and preferably completely outside of the sand bed but touching the sand bed top surface. If the dislodging member is substantially but not completely outside of the bed, the dislodging member may contact the sludge mat M, and optionally the mixed liquor above the mat, and preferably only up to about 1 inch depth of the sand out of a sand bed that is about 12 inches deep (preferably in the range of 8–16 inches). In instances in which the member 10 is completely outside of the bed, it is preferably less than about 2 inches from the surface, more preferably less than 1 inch from the surface, and, most preferably, touching the surface. The sludge mat is believed to begin blinding the filter bed surface when it forms in a thickness of greater than about ½ inch, and it is believed to be on the order of 2–5 inches thick in most operations wherein a dislodging blade is not operating.

In a reactor with a properly-operating sand stirring blade, the sand bed normally will be substantially flat, and certainly flat plus/minus 2 inches. Because these small variations in sand level are expected, however, the preferred dislodging members preferably ride along the surface, and up and down with the surface, preferably without plowing or otherwise moving the sand to any significant extent. With greater variation in the sand level, however, caused by reactor upsets or other phenomenon, the dislodging members may tend to plow or otherwise move small amounts of sand for short distances, for example, for a few inches while the blade portion is dragged through a higher hill of sand. Similarly, due to possible "valleys" in the level of the sand surface, a blade portion that normally contacts the sand bed surface may not contact the surface constantly, or along the entire length of dislodging member. Methods of using the invented sludge mat dislodging system may comprise operating it occasionally, most of the time the reactor is operating, or continuously.

Figure 2:
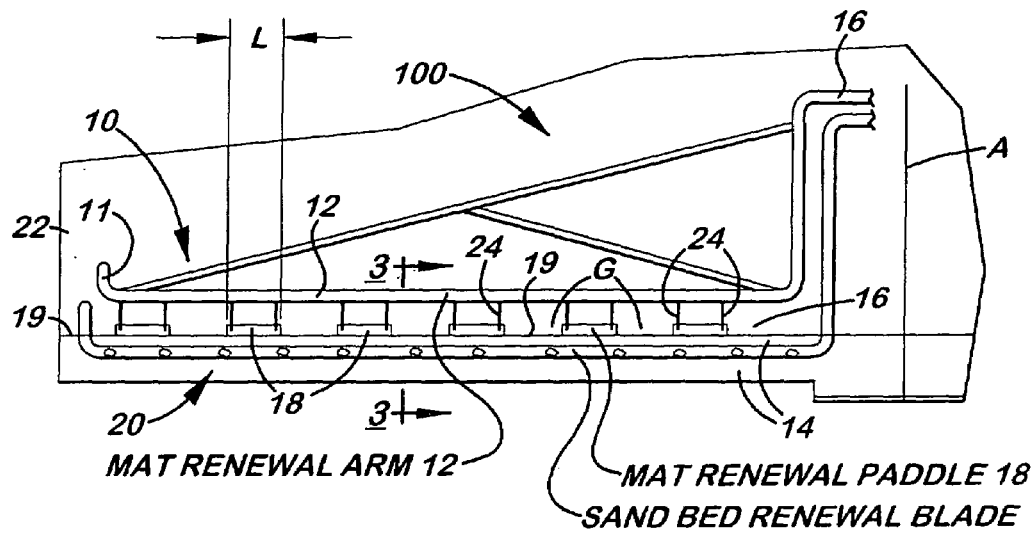
FIG. 2 is a partial cutaway view of one embodiment of the invention, showing a sand bed stirring blade inside the sand bed and one embodiment of the invented sludge mat renewal system comprising a dislodging unit on top of the sand bed.

Referring now specifically to the drawings, there is shown apparatus for a prior method of unplugging a sand filter bed (FIG. 1), and several, but not the only, embodiments of the invented filtration media renewal and control that includes sludge mat dislodging. In FIG. 2, an anaerobic microbial sludge blanket reactor 100 is provided with a settled bed of course particulate, at the bottom of the vessel, serving as a filter bed or "sand bed" 14 for filtering the reactor effluent. The course particulate may be various compositions, such as 10-40 mesh sand, but bigger or smaller sizes may be used.

The reactor in FIG. 2 illustrates a dual filtration system, comprising both a sand bed renewal system 20 and a sludge mat renewal system 10. The sludge mat renewal system 10 comprises at least one sludge mat dislodging member at the top surface of the sand, sweeping along the top surface of the sand bed, preferably in contact with the sand bed but not projecting into the sand bed and not hanging significantly above the surface of the bed.

Figure 3:
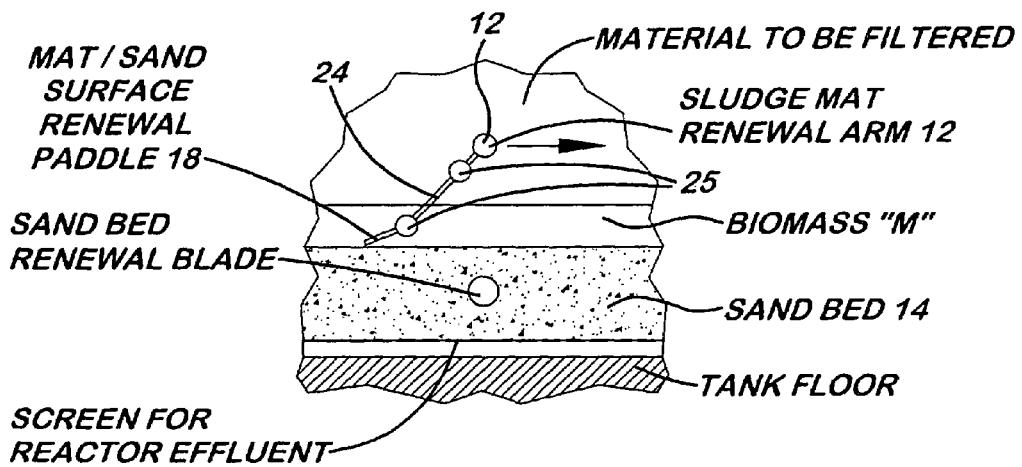
FIG. 3 is a partial, detail cross-sectional view of the embodiment of FIG. 2, viewed along line A—A, illustrating an embodiment of a sludge mat renewal paddle trailing from a support arm.

For example, the embodiment shown in FIGS. 2 and 3 includes a paddle-style sludge mat dislodging system 10, in combination with a lower, in-sand-bed stirrer blade 20 in a microbial reactor 100. The mat dislodging system 10 comprises a single radial arm 12 rotating on an axis A somewhat above the surface of the sand bed 14. The radial arm 12 serves as both support structure for the dislodging members (paddles 18) and as a means for providing fluid flow to reach a propulsion nozzle 11. The radial arm 12 may comprise one or more tubes and other struts, bars, and braces, as needed to provide the structural integrity, shape, and length needed. The radial arm 12 connects generally at fluid connection 16 to a vertical conduit (not shown) that conducts fluid to the hollow inside of the radial arm. Mixed liquor may be pumped through a hollow portion of the radial arm and out of propulsion nozzle 11 in the trailing direction (into the paper in FIG. 2), thereby powering system 10. The propulsion nozzle is preferably at the distal end of the radial arm, but there may be more than one nozzle located at various radii on the arm. A dual feed swivel system allows fluid flow to the radial arm during arm rotation. Dual feed swivel systems may be available from Dynamic Sealing in Minneapolis/St. Paul, Minn., U.S.A.

Dislodging system 10 in FIG. 2 includes a plurality of dislodging members, "renewal paddles" 18, radially spaced along the support arm 12. Paddles 18 hang down from the support arm 12 on one or more flexible connectors 24, and are dragged by the radial arm 12 along the top surface 19 of the sand bed 14. As shown in FIG. 3, the paddles 18 tend to trail the support arm 12, lying on top of the sand bed inside the sludge mat M or where the sludge mat would form if not for the paddles disrupting the formation of the mat M. The paddles 18 are adapted in size and weight to ride along the surface of the sand bed but preferably not to dig into the sand bed or plow the sand bed at any radial arm speed. The preferred jointed (25) or flexible attachment of the dislodging members to the radial arm should be such that the members do not twist out of parallel alignment with the support arm. The dislodging members or the bracket holding one or more of the dislodging members may be weighted to ensure that the dislodging member(s) do not "fly" upwards behind the radial arm instead of resting on and riding on the sand surface.

Fluid flow through a propulsion nozzle/opening in the trailing side of the sludge mat dislodging system is normally sufficient for powering the system, but leading side opening(s), as discussed in U.S. Pat. No. 6,346,412, may also be used if needed to fluidize the sludge mat in front of the radial arm. As discussed earlier in this description, propulsion flow and/or fluidizing flow should be positioned and controlled (preferably, independently) so that solids and the biomass therein are not shredded/pulverized.

Other dislodging members may be effective, including bars, rods, chains, flaps, nets, or other protrusions or appurtenances of many sizes and shapes. The dislodging members may be rigid and/or flexible. The dislodging members may be connected to their respective carrying arms by flexible, jointed, and/or rigid connections or may extend integrally from the carrying arm. While a flexible or jointed connection is preferred, a rigid member with a rigid connection may be utilized, especially if the member is sized carefully to ride on the filter bed surface. In general, it is preferred that the dislodging members are discrete members that are relatively short (dimension L in FIG. 2) when compared to the reactor radius, and that are arranged end-to-end in series along the radial arm with gaps G between the members into which dislodged sludge may move. Each dislodging member may be attached to the overhead support structure via a flexible or jointed connector, or, less preferably, the dislodging member itself may be flexible/joints, for example, a flexible rubber paddle.

Most preferably, the dislodging members are shaped so that the sludge mat is moved aside from the path of the dislodging member, although lifting the mat so that some of it floats upwards may also be acceptable. Thus, the dislodging member may move sludge mat either vertically or horizontal. An additional effect of the dislodging of the sludge mat may be to release gas trapped in the sludge mat, which gas tends to carry some of the sludge mat material with it upwards into the reactor. This gas-induced sludge mat movement may be a substantial part of the vertical movement of the sludge mat.

The dislodging member substantially or completely uncovers the sand surface across which it is passing, preferably with 90–100 wt % removal efficiency of the sludge mat as the dislodging member passes over an area. The sludge mat tends to be pushed over to the sides of the dislodging member and may also float up into the mixed liquor, and solids from the mixed liquor begin settling down onto the newly-cleared path within a few seconds after clearing by the dislodging member. Thus, the dislodging member's path is not cleared for very long after the passing of the member, but the path still may be said to be "cleared" and the clearing step still affects improvement in access of the mixed liquor to the filter bed and in reactor effluent flowrates. In the adjacent "non-dislodged" areas of the sand surface, which are not contacted by a dislodging member, the sludge mat may actually become thicker, but the newly-moved sludge will tend not to be as dense as the original mat.

Preferably, multiple arms or arm portions are provided to clear the mat and also the newly-moved sludge from the gaps left by the first arm or arm portion. For example, a second, separate arm may move independently from, or preferably integrally with, the first radial arm but at 180° from the first radial arm. This second radial arm may have dislodging members (the same or different design as those on the first radial arm) that are spaced differently from the central axis compared to the dislodging members on the first arm. Thus, the dislodging members and the gaps between the dislodging members are staggered/offset, so that, in embodiments in which two arms are 180° from each other, all areas of the sludge mat are dislodged at least every half rotation of the arms. Alternatively, a single radial arm may carry front and rear sets of dislodging units, for example, a front set that dislodges the sludge mat but that leaves gaps, and a second set that follows within a few feet to clear the sludge mat from the front set's gaps.

As discussed above, the invented dislodging system does not significantly enhance the reactor effluent flow rate once the sand bed itself becomes loaded with solids. Therefore, embodiments of the invention preferably comprise the sludge mass dislodging system working in concert with apparatus and methods for backwashing the sand, preferably by stirring and fluidization. Typically, the sludge mat dislodging system operates frequently during a remediation run, but the sand bed stirring blade only operates occasionally. The sludge mat dislodging system operates without slowing or stopping reactor influent and effluent and without otherwise interrupting operation of the reactor. Back-washing of the sand bed, however, interrupts the reactor operation, as the reactor effluent must be shut off to prevent massive loss of biomass out of the reactor. When the sand bed stirring blade is used, the sludge mat dislodging system is normally not used.

In addition to a sludge mat dislodging system and preferably a sand bed stirring system, some embodiments of the invention will also include a stirrer blade in the mixed liquor in the main body of the reactor. Such a mixed liquor stirring blade would be provided at least one foot above the sand bed, and preferably from 1–10 feet from the sand bed in a 13–35 foot high reactor. Such a mixed liquor stirrer arm would not touch the sand bed and does not disrupt or disperse the sludge mat forming on the surface of the bed. The distance between a mixed liquor stirrer arm and the sand bed is too great for the arm to affect any dispersal in the area of importance, and consequently it does not prevent sludge mat formation.

An especially-preferred embodiment of the invention is shown in FIGS. 4–9. The microbial reactor 200 comprises a vessel 202, a sand bed 214, a slotted screen 206 generally underneath (or alternatively inside) the sand bed, an outlet 208 for sending filtered effluent out of the reactor as product and/or to storage for later recycle to the reactor. Mixed liquor 209 in the reactor vessel comprises water and solids (food, grease or other BOD and contaminants, and microbes) and optionally other additives deemed appropriate for remediation of the mixed liquor.

Figure 4:
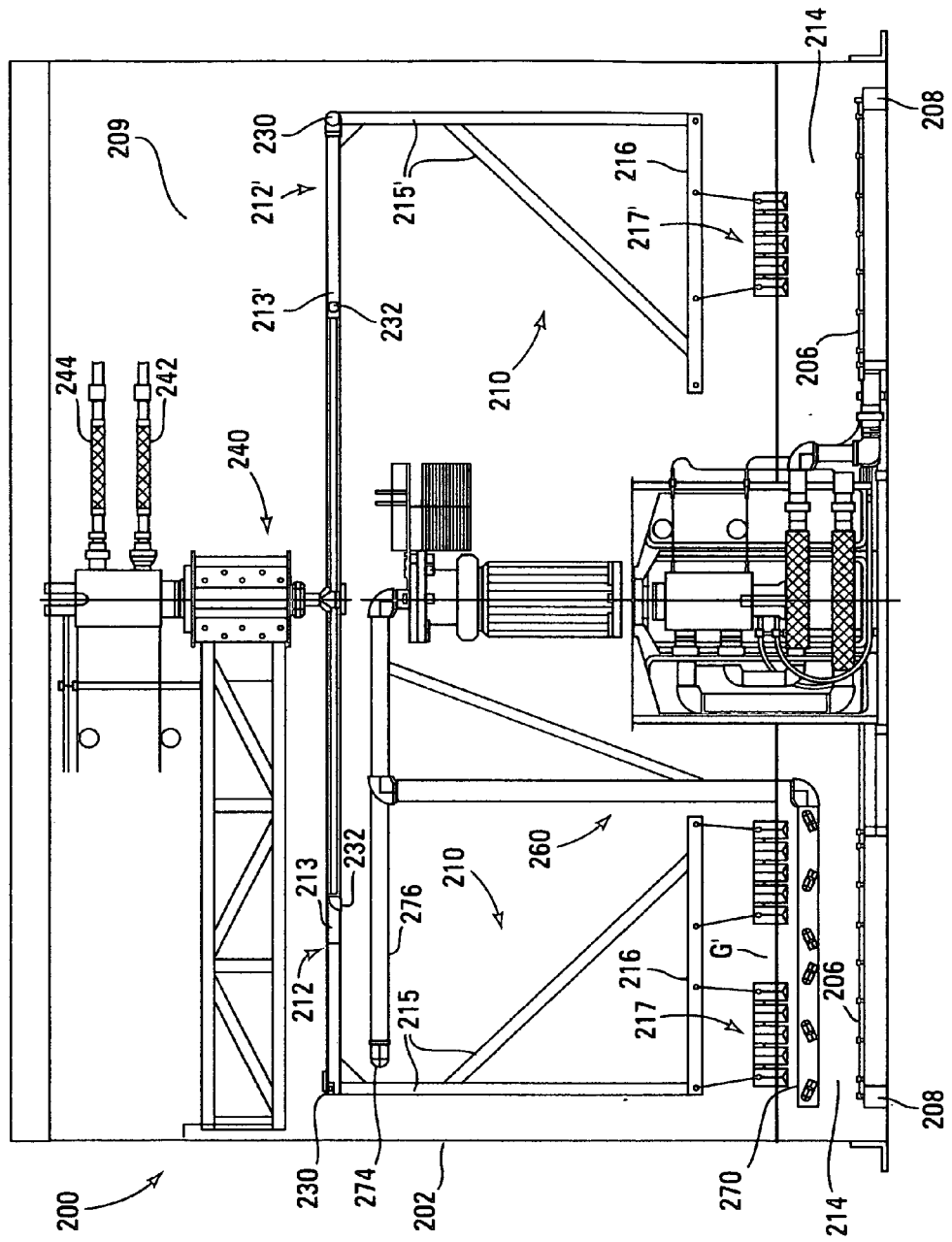
FIG. 4 is a side view of a microbial reactor comprising one embodiment of a sand bed renewal blade plus one embodiment of a sludge mat renewal system comprising mat dislodging units.

The sludge mat dislodging system 210 of FIG. 4 comprises two radial arms 212, 212' extending 180° from each other. The radial arms 212, 212' comprise radial portions 213, 213' and axial portions 215, 215', wherein the radial portions are high up in the mixed liquor, for example, about 2–4 feet up above the sand bed 214. The axial portions 215, 215' extend down within about 1–2 feet of the sand bed, extending around the other structure (such as sand blade system 260 and propulsion arm 276) and generally ending in radial bars 216, 216' that hold dislodging units 217.

The radial arms 212, 212' are propelled by propulsion nozzles/openings 230, at or near the corner junction between the radial portions 213, 213' and the axial portions 215, 215'. The radial portions 213, 213' may also comprise or support other conduits and outlet nozzles, for example, chemical/nutritive additive nozzles 232. The radial arms 212, 212' are rotatably supported and supplied with propulsion liquid by dual feed swivel 240. Propulsion fluid supply 242 and chemical additive supply 244 are (partially) shown entering the dual feed swivel.

Sand stirring blade system 260 is included in reactor 200, comprising a single stirring blade 270 with fluidization nozzles 272 pointing preferably slightly downward and not directly at each other. The propulsion nozzle/opening 274 for the blade system 260 is located on an upper radial arm 276 that is rigidly connected to the rest of the sand stirring blade arm but that is significantly higher in the reactor than blade 270. As discussed above, this locates the propulsion jet up and away from the sand and the sludge mat, and helps prevents shredding/pulverizing of biomass. The propulsion and the fluidizing functions of the stirring blade system 260 are preferably controlled separately and may use different liquids. Like the sludge mat system 210, the sand stirring blade system 260 rotates on a dual feed swivel system, which allows for one or more fluid streams through the equipment even during rotation.

FIGS. 5–9 illustrate details of the sludge mat dislodging units 217. Each dislodging unit 217 comprises a plurality of V-shaped dislodging members 218 aligned side-by-side on a bracket 219. The bracket 219 is hung by flexible connectors 224 from the radial bars 216.

Figure 5:
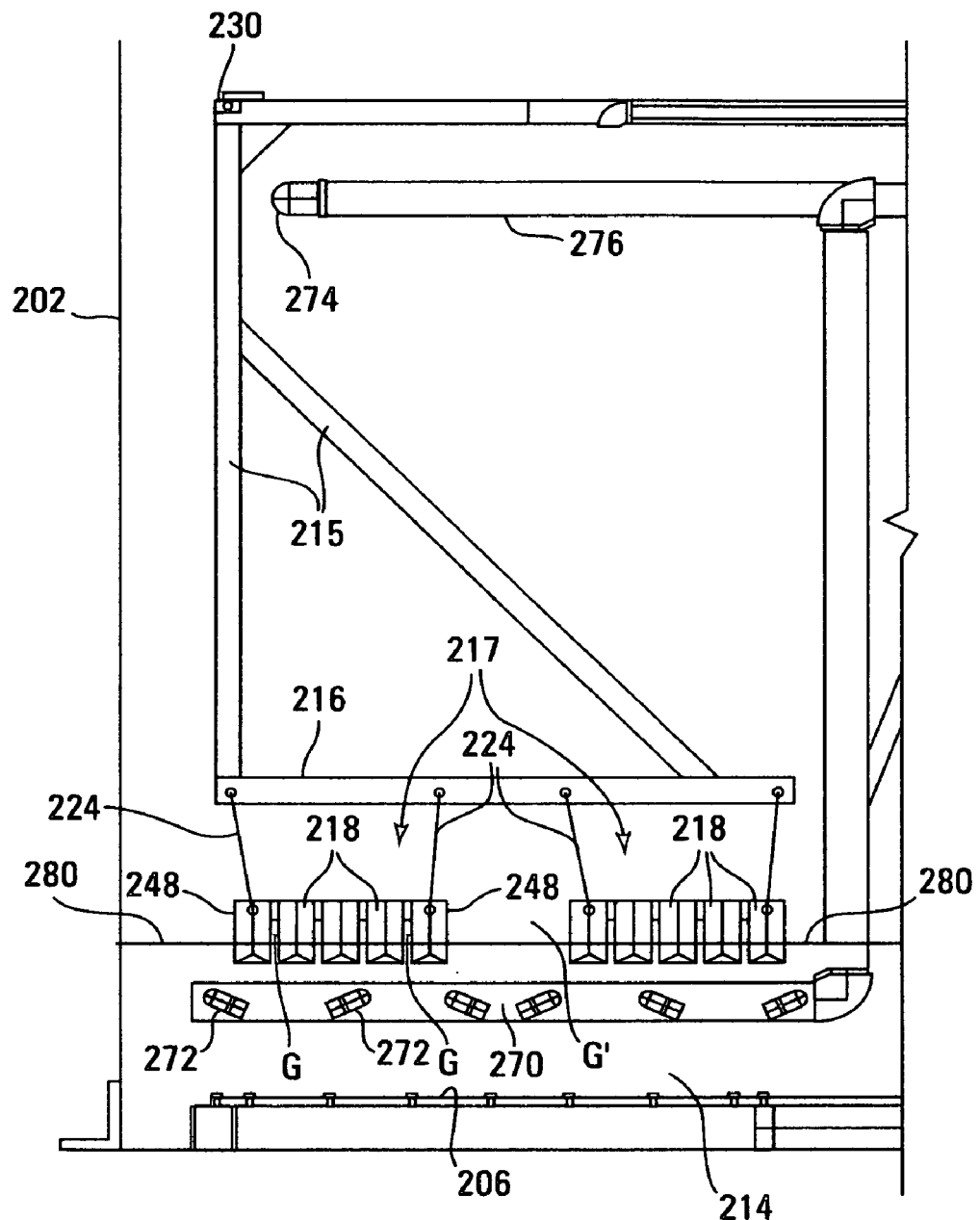
FIG. 5 is a detail view of a portion of the embodiment of FIG. 4, showing a portion of both the sand bed blade and the sludge mat dislodging units.
Figure 6:
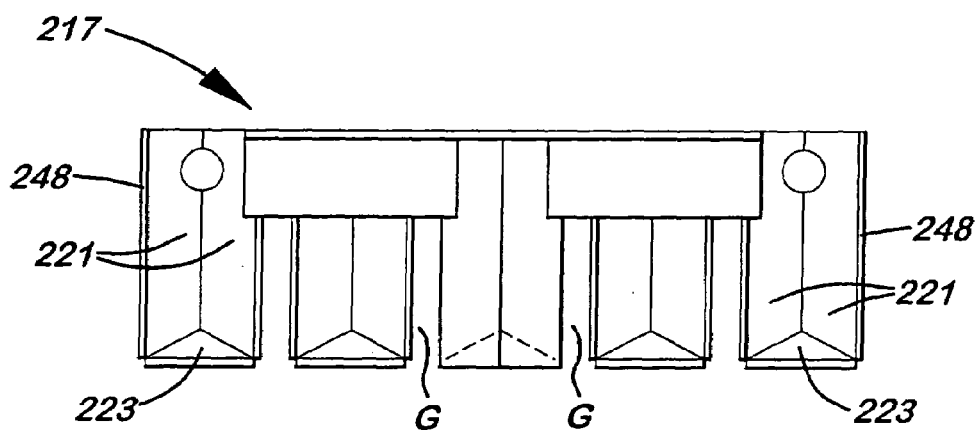
FIG. 6 is a front view of one of the sludge mat dislodging units of FIGS. 4 and 5.
Figure 8:
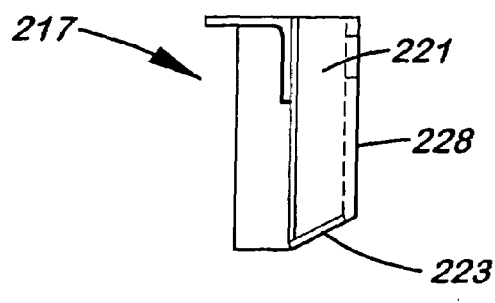
FIG. 8 is an end view of the dislodging unit of FIGS. 6 and 7.
Figure 9:
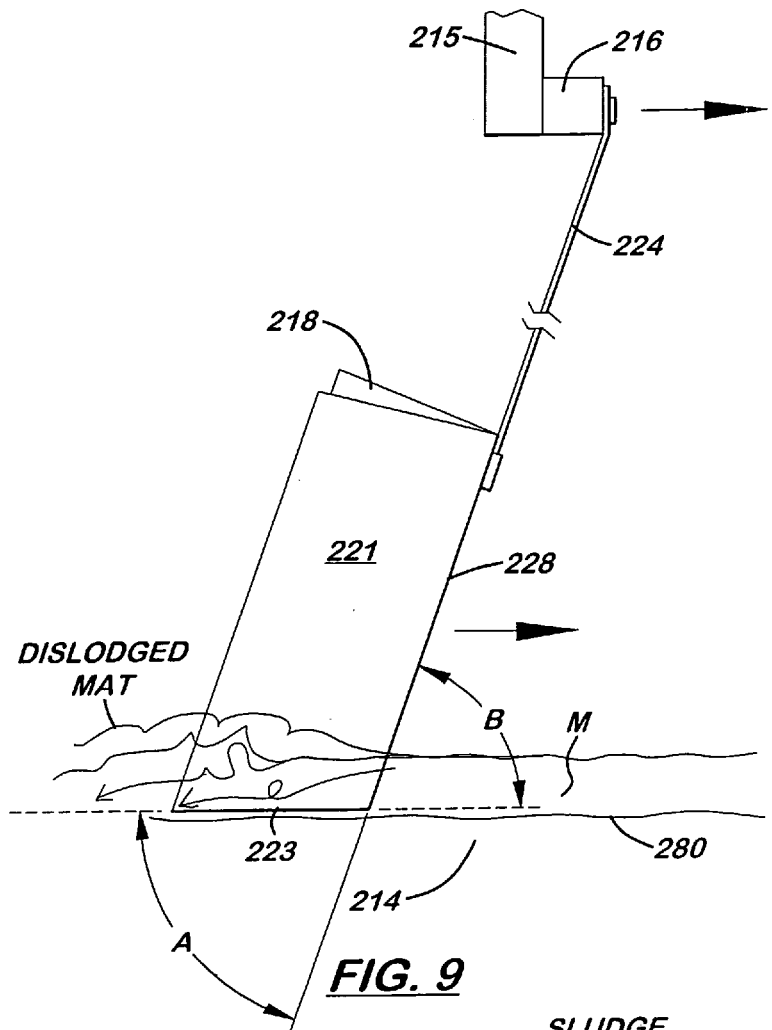
FIG. 9 is a schematic side view of a dislodging member as in FIGS. 4–8, shown in relationship to the sand bed surface.

While FIGS. 5 and 6 show the dislodging units 217/members 218 extending below the top surface 280 of the sand, this schematically represents that the combination of the members 218 and connectors 224 is longer than the vertical distance from the radial bars 216 to the sand surface 280, but that, in operation, the radial bars 216 drag the dislodging units/members slightly behind them so that the dislodging units 217 follow at an angle to the sand surface 280 (See FIG. 9).

Dislodging members 218 have a slanted (preferably V-shaped) front surface 221 with front ridge 228, and a beveled/slanted bottom surface 223 that is at approximately 30 degrees from the ridge 228 (angle A preferably in the range of 10–45 degrees). The front ridge 228 tends to move forward through the sludge mat at an angle to the plane of the sand surface (angle B also preferably 30 degrees and in the range of 10–45 degrees) and bottom surface 223 rides/slides generally parallel to the sand surface 280. Therefore, the front surface 221 with its pointed front extremity (ridge 228) move forward into the sludge mat, pushing the mat aside via both sides of each member 218. Therefore, the preferred dislodging member may be said to have at least one generally vertical side that is slanted relative to the direction of forward travel of the member. This way, that at least one slanted side pushes sludge to the side relative to the leading edge of the member.

The sludge slides along the front faces (221) of the members 218 and moves into the gaps G between the members 218 and into the gaps G' between the units 217. This helps prevent the members 218 from pushing a large amount of sludge in front of them. Instead, the sludge mat is dislodged and moved aside to rest on the mat in gaps G, G' beside where the member 218 has passed. Some sludge may be lifted upwards and/or may float away, but the preferred V-shape dislodging member tends to instead push the sludge to the side. These methods produce very little or no shredding or damage to the biomass, and yet they clear and clean large areas of the sand surface.

Figure 7:
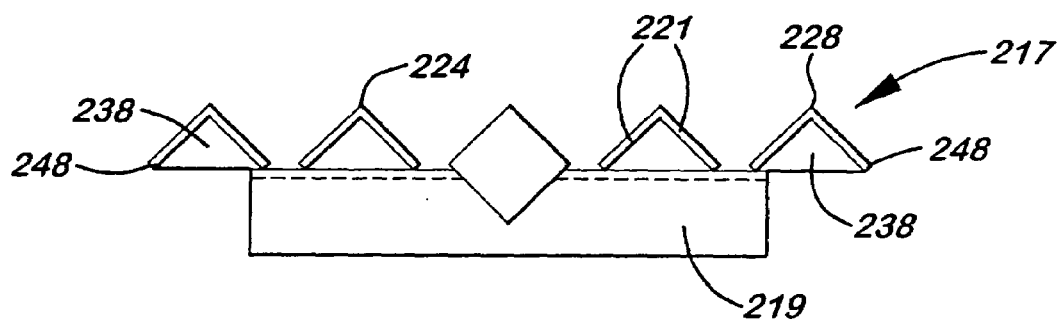
FIG. 7 is a top view of the dislodging unit of FIG. 6.

Four of the dislodging members shown in FIG. 7 have hollow interiors 238, but these interiors do not accumulate sand due to the direction of travel and the slant of the bottom surface 223. One of the four members is a solid and/or weighted dislodging member 218', which brings the total weight of the dislodging unit 217 to an appropriate amount to disrupt and dislodge the sludge mat without digging into the sand. Typically, a dislodging unit 217 of the design shown in FIGS. 6–8 weighs 5–8 pounds.

FIG. 5 illustrates that the dislodging units 217 on one arm 212 are offset from the radial location of the units 217' on the opposite arm 212', so that the sludge mat in the large gap G' left between the units 217 may be cleared by the opposite unit 217'. Regarding the smaller gaps between the members 218, sludge moves into these gaps, but, due to the fluid movement in the reactor, and the narrowness of these gaps, little mat builds up permanently in along these gaps and, instead, most of the mat eventually moves all the way to the far side edges 248 of the units 217, 217'. Thus, substantially all of the sand surface, from the outer edge of the furthest-out member 218 to the inner edge of the closest-in member 218, is cleared of mat once about every 360° rotation of the system.

A control system may be designed to rotate the sludge mat dislodging system as needed or desired, based on pressure drop across the filtration system (sand bed plus mat), predetermined timing set for a particular feedstock, or other criteria. Likewise, the control system may operate the sand stirrer blade as needed or desired, typically based on the buildup of pressure drop across the filtration system. For example, the dislodging system may be operated most of the time during operation of the reactor, for example, 30–45 minutes of every hour, or, for high effluent operations, 45–60 minutes of every hour. The dislodging system may rotate, for example, about 1–4 rpm, and preferably about 2 rpm. The sand blade stirring blade may be operated several rotations every few hours, for example, for about 4–10 minutes every 4–6 hours, or up to about 4–10 minutes every 2–3 hours. The sand stirring blade may rotate, for example, about ¼–2 rpm, and preferably about ½ rpm.

Figure 10:
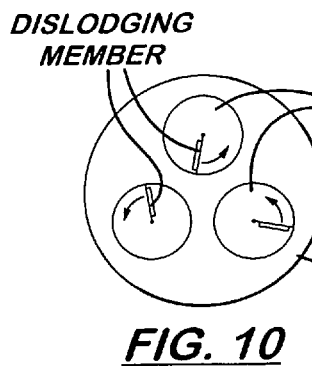
FIG. 10 shows schematically an alternative embodiment wherein multiple sludge mat renewal modules are installed in a large-diameter reactor.

FIG. 10 illustrates a plurality of rotary sludge mat dislodging modules in a single vessel. This may be effective for reactors that are so that a single rotating arm for supporting dislodging members may not be practical because an extremely long rotating arm would be required. Preferably, rotating arms up to about 15 feet long are preferred, so that a single rotating arm may work effectively in a vessel up to about 30 feet in diameter. For vessels larger than 30 feet in diameter, a plurality of rotating modules may be desirable.

Figure 11:
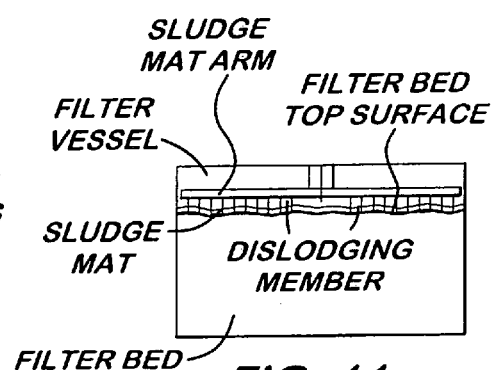
FIG. 11 shows an alternative embodiment of a vessel with a filter bed utilizing an embodiment of the invention, wherein the vessel is a tertiary sewage water treatment filter.

FIG. 11 illustrates an alternative embodiment of the invention wherein a sand bed and a sludge mat dislodging system according to embodiments of the invention are provided in a filtration vessel in which no process/unit operation other than filtration is taking place in the vessel. The invented sludge mat dislodging system may be utilized with or without a sand bed stirring system as desired.

Figure 12:
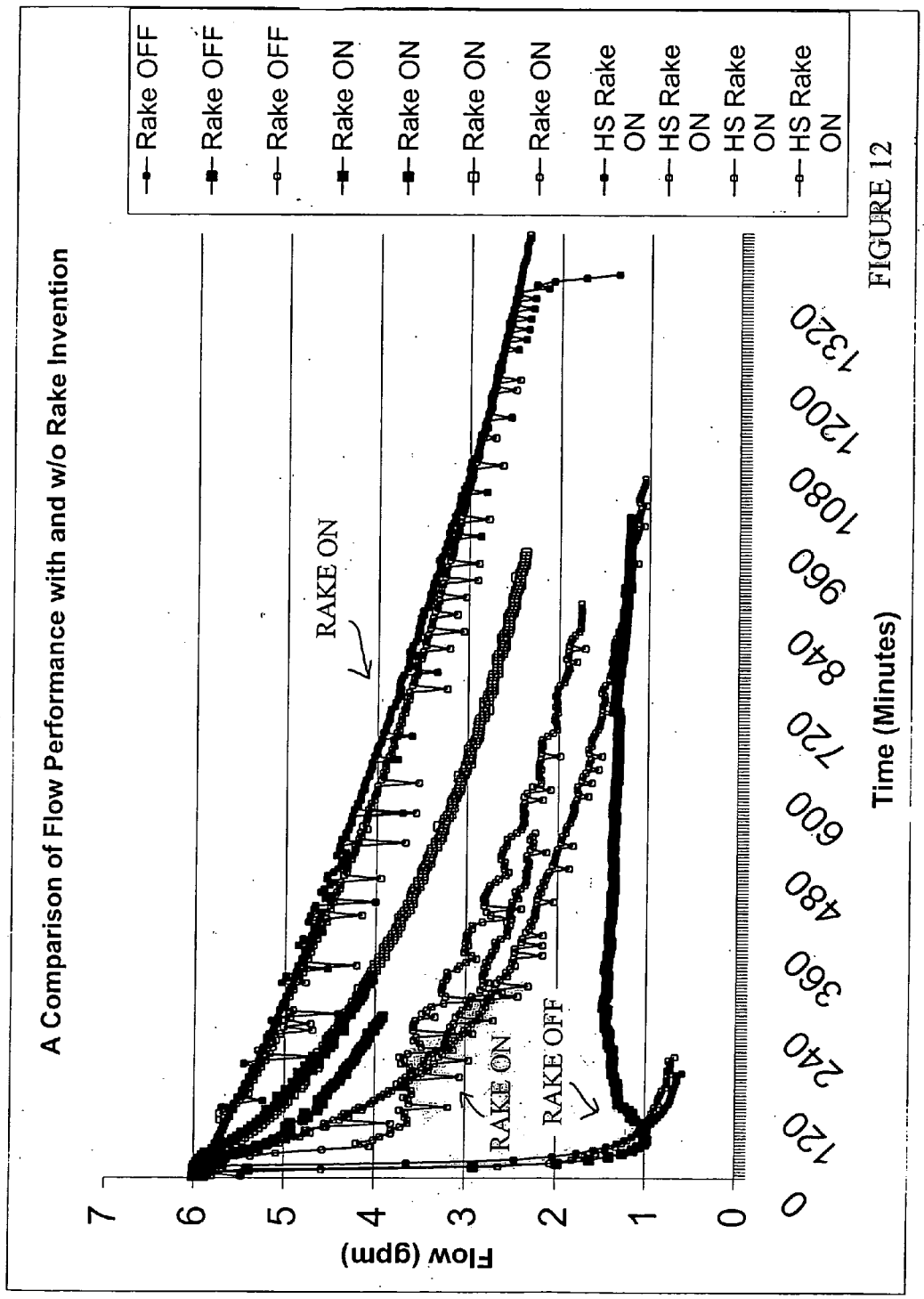
FIG. 12 illustrates data from operation of a sludge blanket reactor having a filter bed, both with and without operation of an embodiment of the invented sludge mat dislodging methods and apparatus.
Figure 13:
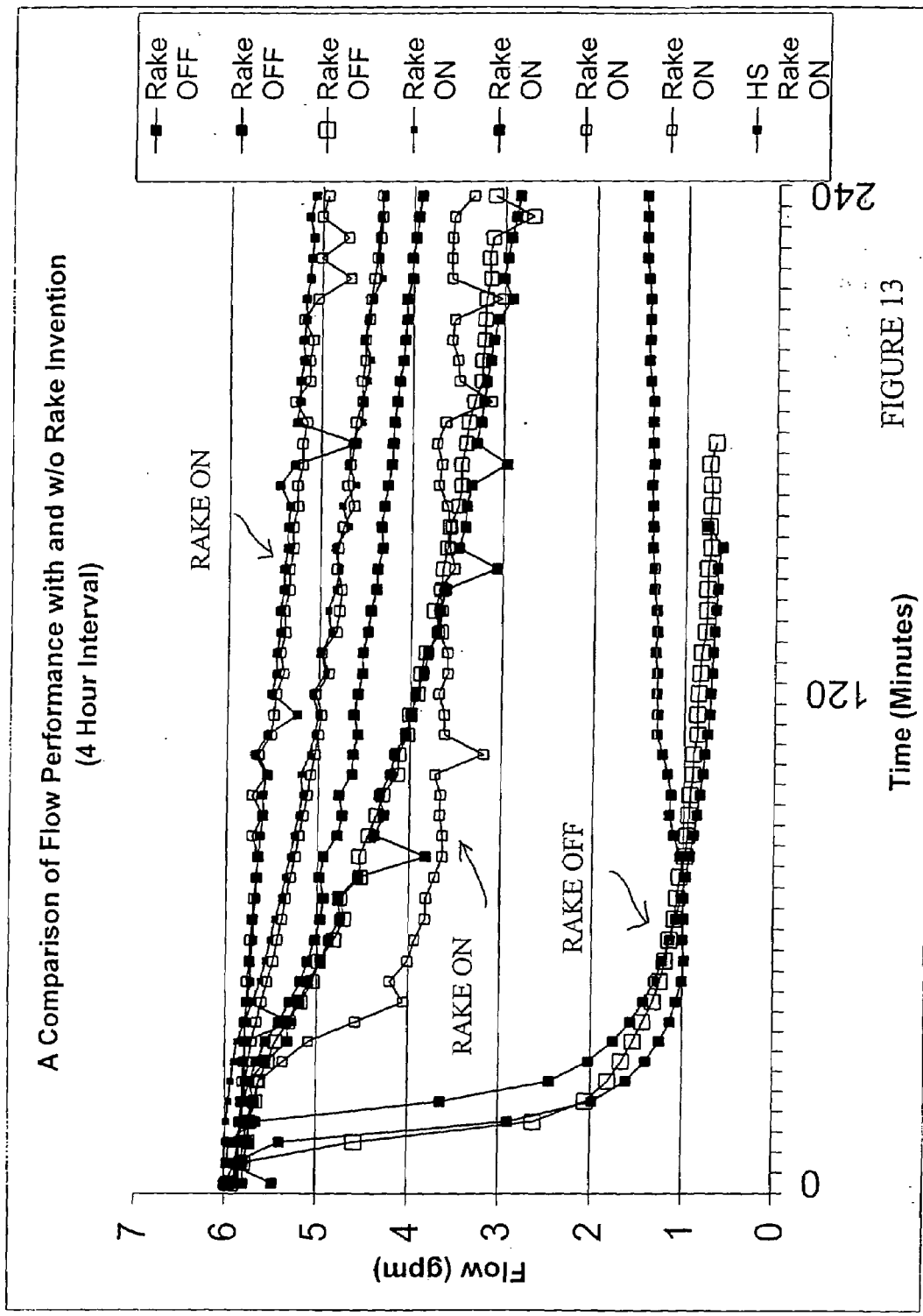
FIG. 13 is a plot of the first four hours of data from the operations of FIG. 12.
Figure 14:
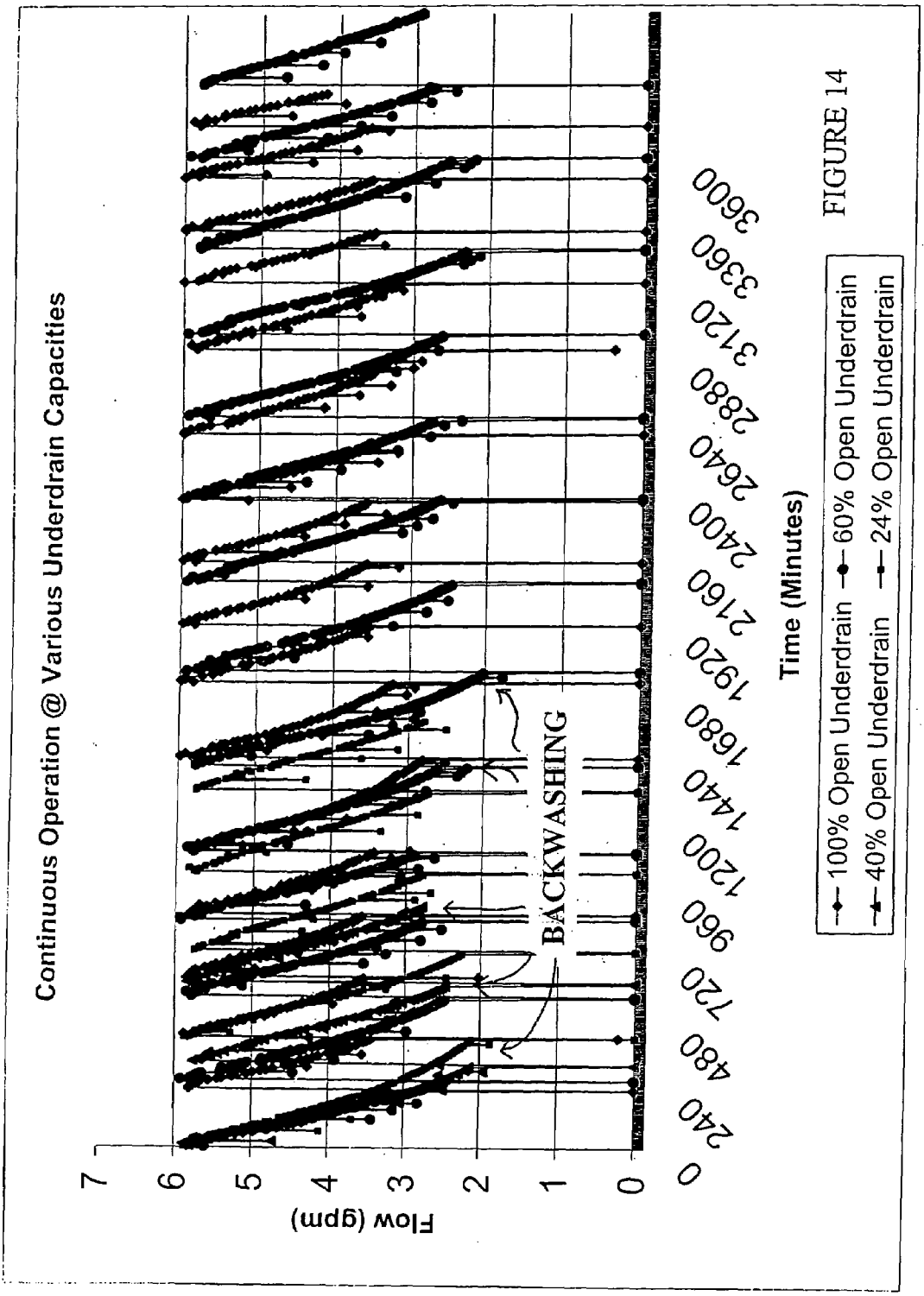
FIG. 14 illustrates operation of the sludge blanket reactor of FIGS. 12 and 13, with repeated runs comprising operation with an embodiment of the invented sludge mat dislodging system, followed by sand bed back-washing with a sand stirring blade, and restart of the operation with the dislodging system in operation.

Operations including embodiments of the sludge mat dislodging system greatly improve run times between sand bed plugging, as evidenced by the data shown in FIGS. 12–14.

EXAMPLE I

FIG. 12 shows data from pilot plant operation of an anaerobic sludge blanket reactor having a sand bed, remediating activated sludge from a municipal waste facility, characterized by 0.5–3 wt -% solids, percent solids. Many runs were done, some with and some without a sludge mat dislodging system in operation (also known as the "rake"), and without any sand blade stirring or other backwashing. Reactor effluent flowrate data was taken every five minutes. A fresh sand bed, given the provided slotted screen and reactor effluent piping, was capable of a maximum reactor effluent flowrate of about 6 gpm.

In the runs without the rake (without sludge mat dislodging), reactor effluent dropped quickly from the maximum of 6 gpm to a small fraction of that flow. For example, in the runs without the rake in operation, the reactor effluent dropped to ⅓ of the maximum flow (about 2 gpm) within less than half an hour. By the time two hours had elapsed, the flowrate had dropped to less than 1 gpm, or less than ⅙ of the original flow.

On the other hand, in runs including operation of the rake (with sludge mat dislodging), the reactor effluent dropped much more gradually, from 6 gpm to 4 gpm over periods ranging from about 3 to 12 hours. Only after 10+ hours did reactor effluent drop to as low as 2 gpm. In all of the rake-on runs, the reactor effluent performance was sufficient to allow at least four-hour runs without reaching reactor effluent flowrates that would make sand bed backwashing necessary and desirable. The rake-on runs were done with continuous operation of the rake, but intermittent operation of the rake would also produce acceptable run lengths in between backwashing.

FIG. 13 plots the same data as shown in FIG. 12, but only the first four hours of each run, given the fact that a four-hour run before backwashing is a reasonable and desirable operation mode. Clearly, in a four-hour run, the operations without the rake produced unacceptable results, wherein the reactor effluent dropped below acceptable rates within the first half hour. The operations with the rake produced acceptable results, wherein the reactor effluent stayed at acceptable rates and were greater than 50% of the original flowrate for the entire four hours.

EXAMPLE II

An extended operation was performed using the reactor and activated sludge feed of Example I, with substantially continuous rake operation between sand bed backwashings via a sand bed stirring system. Data from this operation is plotted in FIG. 14. This operation was repeated several times, with various percentages of the slotted screen ("underdrain" underneath the sand bed) open, to test the effect of the amount of underdrain in use in the reactor. Each cycle (from beginning of reactor operation to the time of shutting off reactor effluent and backwashing) was approximately four hours. The data shows that, during each cycle, reactor effluent stayed at acceptable levels, slowly dropping from approximately 6 gpm to approximately 3 gpm. The data shows that, after each backwashing of the sand bed, the flowrate went up to, or very near to, the original flowrate of 6 gpm. Many cycles were successfully performed, illustrating the long-term feasibility and operability of a sludge blanket reactor using a filter bed in combination with the invented technology.

Thus, the invented methods of operation include rotating or otherwise moving a dislodging member through at least a portion of the sludge mat area on top of a filter bed in a vessel/reactor. Preferably, the methods include operating the dislodging system during normal operation of the reactor, that is, during influent flow of wastewater, effluent flow of filtered water, and ongoing microbial remediation of the waste solids in the mixed liquor. Thus, the invented methods and apparatus are for ongoing use during the process, rather than for use during maintenance during shut-down. Preferably, the invented methods comprise dislodging the sludge mat but not removing it from the reactor. Preferably, the methods also include repeated cycles of downflow reactor/vessel operation with a dislodging member operating at least part of the time in some or all of the cycles, wherein the cycles are defined by the time between backwashings of the filter bed.

Embodiments of the invented methods may be beneficial in many different remediation operations. For example, the invention may be used with process feeds containing contaminants consumed quickly by the provided microbes. For example, feeds in the range of 1000 mg/L up to 50,000 mg/L BOD require reactor residence times of only 12–48 hours, and a reactor for such an operation would typically be designed for high effluent flow rates in the range of 0.5 to 4 days of hydraulic residence time. This may be compared to effluent flow rates in the range of 5–12 days of hydraulic residence time for wastewater containing greater than 50,000 mg/L BOD. With the invented sludge mat control and renewal methods/operation, a high flowrate operation of 0.5–4 days hydraulic residence time is achievable and practical.

The instant invention may be applied to feeds containing a wide range of suspended solids. High TSS and/or FOG reactors, anaerobic or aerobic reactors, sludge thickeners, municipal water filtration for raw river or lake water, or tertiary waste treatment of sewer water containing as little 30–50 ppm solids, may all benefit from the instant invention. With the instant invention, anaerobic remediation of greater than 1000 mg/L TSS may be achieved with 95–99% removal of BOD. Embodiments of the invention may process, for example, up to about 100,000 mg/L of TSS and FOG. In such an operation, a longer residence time (of 5–12 days) is typically needed, but acceptable cycle times (preferably about 4–12 hours) may be achieved in spite of the very high solids in the reactor and the resulting high probability of a heavy/thick sludge mat forming. While the filtration and effluent systems of many sludge blanket reactors may be considered effective if they are producing 0.1 gal reactor effluent per sq. ft/minute, the instant invention may greatly increase this throughput to at least 0.2–0.4 gal reactor effluent per square ft/minute.

Although this invention has been described above with reference to particular means, materials and embodiments, it is to be understood that the invention is not limited to these disclosed particulars, but extends instead to all equivalents within the broad scope of this description and the following claims.

What is claimed is:

1. A downflow microbial remediation reactor comprising:
    a filter bed having a top surface;
    mixed liquor comprising waste solids and microbes in water above the filter bed, the mixed liquor being microbially-remediated in said reactor; and
    a sludge mat on said top surface comprising settled waste solids and microbes from the mixed liquor;
wherein the reactor has a liquid effluent outlet in or beneath the filter bed;
wherein there is a renewal arm in the reactor moveable above the top surface and having at least one sludge mat renewal member moveable through the sludge mat to disrupt a portion of the sludge mat so that liquid flow to and through the filter bed and to the liquid effluent outlet is increased.

2. The reactor of claim 1 wherein the renewal arm is moveable by being rotatable in a plane generally parallel to the top surface, wherein the sludge mat renewal member is connected to the renewal arm by a connection selected from the group consisting of a pivotal connection, a flexible connection, a jointed connection, and a rigid connection.

3. The reactor of claim 2 wherein the sludge mat renewal member trails the renewal arm when the renewal arm is rotated in said plane.

4. The reactor of claim 1 further comprising the sludge mat renewal member being selected from the group consisting of: a blade, a paddle, a bar, a rod, a chain, a flap, and a net.

5. The reactor of claim 1 further comprising the sludge mat renewal member being V-shaped and having a front ridge for moving forward into the sludge mat.

6. The reactor of claim 1 wherein the sludge mat comprises 2–20 wt-% percent solids in water and the mixed liquor comprising less than 2 wt-% solids in water.

7. The reactor of claim 1 wherein the filter bed is particulate selected from the group consisting of sand, pebbles, and carbon.

8. The reactor of claim 1 further comprising a propulsion arm connected to said renewal arm, the propulsion arm having a propulsion nozzle in fluid communication with a fluid source and configured to direct a jet of fluid from said fluid source into the mixed liquor to move the renewal arm.

9. The reactor of claim 8 wherein the propulsion nozzle is located 2–4 feet above the sludge mat to minimize disintegration of waste solids and microbes in the sludge mat.

10. The reactor of claim 9 wherein the propulsion nozzle is located 2–4 feet above the filter bed.

11. The reactor of claim 8 wherein the propulsion nozzle is located 2–4 feet above the sludge mat in a middle region of the mixed liquor having a lower concentration of waste solids and microbes compared to the sludge mat, to minimize disintegration of waste solids and microbes by said jet of fluid.

12. The reactor of claim 11 wherein the propulsion nozzle is located 2–4 feet above the filter bed.

13. The reactor of claim 1 further comprising a filter bed stirring arm moveable inside said filter bed.

14. The reactor of claim 13 further comprising a propulsion system configured to move said stirring arm inside the filter bed, the propulsion system being mechanically connected to the stirring arm and having a stirring arm propulsion nozzle located above the filter bed and above the sludge mat, to minimize disintegration of waste solids and microbes.

15. The reactor of claim 1 further comprising two of said renewal arms, wherein each of said renewal arms comprises at least one of said sludge renewal members.

16. A sludge blanket microbial remediation reactor comprising:
  a vessel having a filter bed at or near a bottom of the vessel;
  a vessel fluid outlet in or underneath the filter bed for effluent having been filtered through the filter bed;
  a mixed liquor contained within the vessel above said filter bed and comprising water, microbes, and waste solids undergoing microbial remediation;
  a mat comprising a sludge of waste solids and microbes settled on a top surface of the filter bed; and
  a renewal system comprising a member moveable generally horizontally through the mat to disrupt a portion of the sludge so that effluent is maintained through the filter bed and out said fluid outlet during microbial remediation operation.

17. A method of operating a sludge blanket microbial reactor to remediate a waste stream, the method comprising:
  providing a filter bed with a top surface in a reactor;
  providing a mixed liquor in the reactor comprising water, suspended solids, and microbes, wherein some of said suspended solids and microbes settle out of solution onto the top surface of the filter bed to form a sludge mat that is relatively dry compared to said mixed liquor, wherein the sludge mat has a density that restricts flow of liquid into the filter bed; and
  moving a sludge mat renewal member across the top of the filter bed to disrupt said sludge mat and to form a quantity of newly-moved sludge on said top of the filter bed, said newly-moved sludge having a density less than the density of said sludge mat so that liquid accesses the filter bed through said new-moved sludge, is filtered in the filter bed, and exits the reactor.

18. The method of claim 17, wherein said moving a sludge mat renewal member is done while said waste stream is flowing into the reactor and liquid effluent is exiting the reactor.

19. The method as in claim 17, further comprising providing an arm carrying the renewal member, and rotating the arm in the reactor generally parallel to said top surface.

20. A method as in claim 19, wherein rotating the arm comprises pumping liquid through a propulsion opening in a trailing side of the arm.

21. A method as in claim 20, further comprising minimizing shredding, by the liquid pumped through the propulsion opening, of said microbes settled on the top surface of the filter bed, by locating said propulsion opening a distance above said arm in the mixed liquor.

22. A method as in claim 21, comprising locating said propulsion opening 2–4 feet above the filter bed.

23. A method as in claim 19, wherein moving said renewal member comprises pulling a top portion of said member forward with said arm so that a lower portion of said member slides along the filter bed behind the arm.

24. A method as in claim 19, wherein the renewal member is connected to said arm by a connection selected from the group consisting of: a pivotal connection, a flexible connection, a jointed connection, and a rigid connection.

25. A method as in claim 19, wherein the renewal member is selected from the group consisting of: a blade, a paddle, a bar, a rod, a chain, a flap, and a net.

26. A method as in claim 17, further comprising providing a filter bed stirring member inside the filter bed, and intermittently stirring the filter bed with the stirring member.

27. A method as in claim 26, further comprising operating the reactor in a first period comprising said moving the renewal member across the top of the filter bed and comprising a second period comprising stopping said moving of the renewal member, stopping liquid flow out of the reactor from the filter bed, and performing said stirring of the filter bed to fluidize the filter bed.

28. A method as in claim 26, further comprising providing a propulsion system for said stirring member, the propulsion system comprising a propulsion opening above said filter bed and in the mixed liquor.

\* \* \* \* \*